March 5, 1963  R. F. DE MARCO  3,080,175
INDUSTRIAL TRUCK AND ROCKING WHEEL ASSEMBLAGE THEREFOR
Filed March 17, 1961  5 Sheets-Sheet 1

INVENTOR.
ROBERT F. DE MARCO
BY
ATTORNEY.

INVENTOR.
ROBERT F. DE MARCO
BY
ATTORNEY.

March 5, 1963 R. F. DE MARCO 3,080,175
INDUSTRIAL TRUCK AND ROCKING WHEEL ASSEMBLAGE THEREFOR
Filed March 17, 1961 5 Sheets-Sheet 3

INVENTOR.
ROBERT F. DE MARCO
BY
*his* ATTORNEY

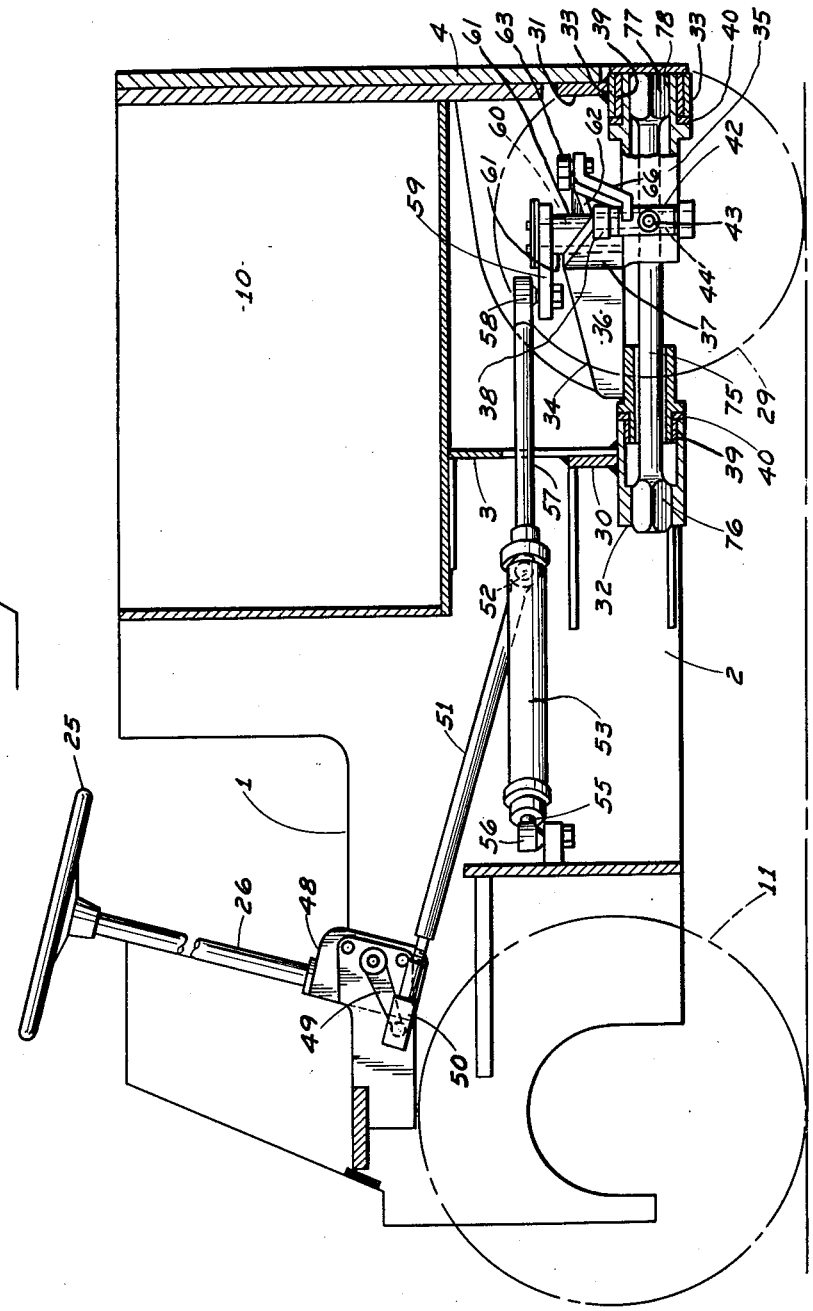

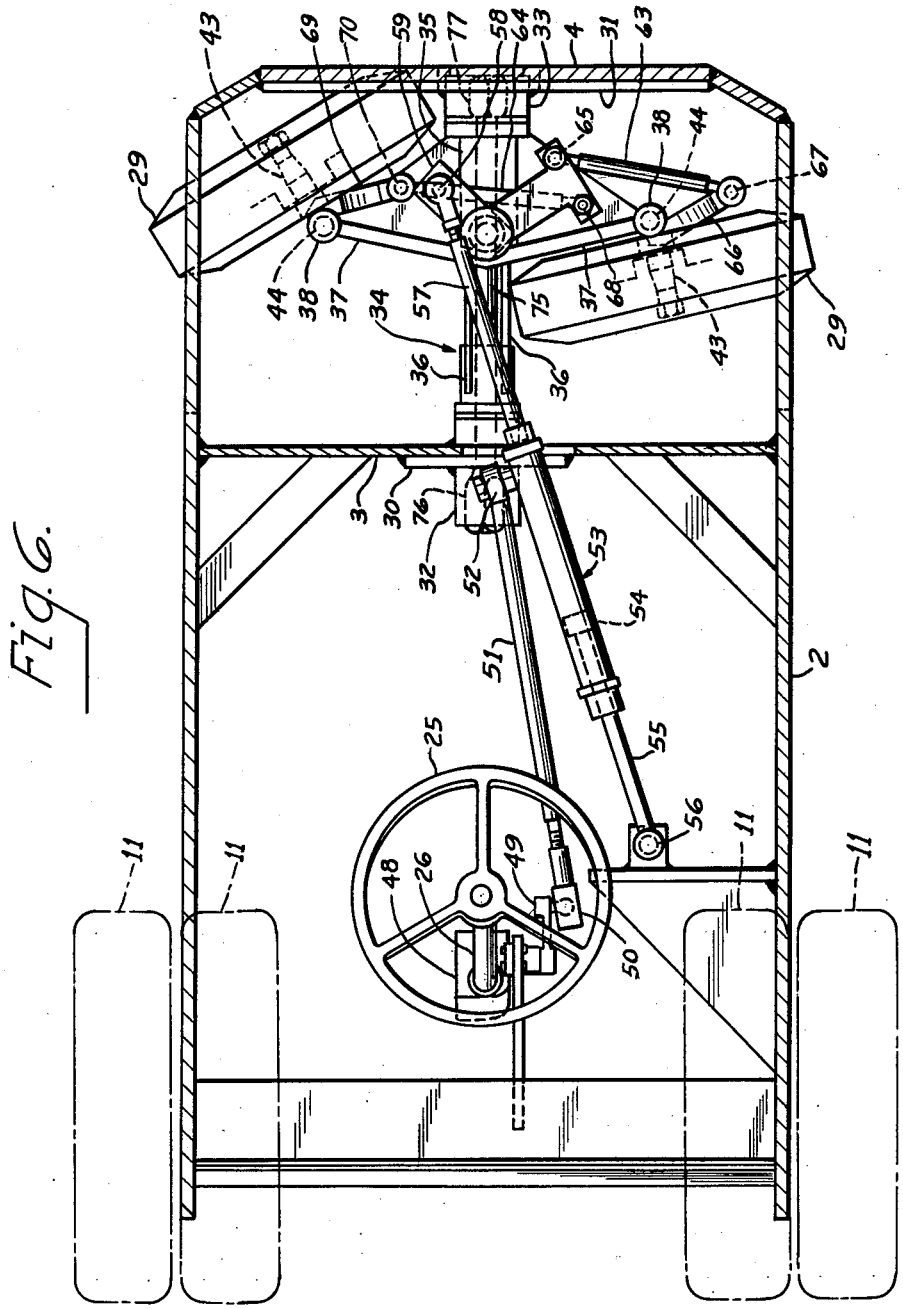

United States Patent Office 3,080,175
Patented Mar. 5, 1963

3,080,175
INDUSTRIAL TRUCK AND ROCKING WHEEL
ASSEMBLAGE THEREFOR
Robert F. De Marco, Mentor, Ohio, assignor to The Heifred Corporation, Willoughby, Ohio, a corporation of Ohio
Filed Mar. 17, 1961, Ser. No. 96,546
6 Claims. (Cl. 280—95)

This invention relates to industrial trucks, and particularly to industrial trucks of the electric motor driven type which are used in and about industrial plants.

Trucks of this character, which include industrial lift trucks, personnel carriers, and the like which, due to the close quarters and narrow aisles in which they must operate, require a very short turning radius. The optimum turning radius is one which would be effected by turning the rotational axes of the dirigible wheels approximately directly forwardly and rearwardly of the truck body so that the planes of the wheels would be disposed as near as may be across the body at right angles to the body length. For this reason, these trucks generally employ two dirigible wheels, usually the rear wheels, which, since a short turning radius is to be maintained, must be of narrow gauge. This, in turn, limits the space in which they can be turned for steering.

Again, many such trucks, particularly the lift trucks, are equipped with power mechanism, usually an electric motor and a large bank of batteries. Less frequently, they are equipped with a gasoline engine with its associated power transmission equipment and fuel load. The power mechanism generally fills a compartment which overlies, laterally overhangs, and extends a considerable distance above, the level of the dirigible wheels. In the case of the electric motor drive, this compartment is packed with batteries and the weight is very great. Due to the requirements for wheel space, this large, heavy load necessarily has to be disposed so that it has a very high center of gravity relative to the wheels. Accordingly, this load is very unstable, particularly if these wheels are mounted for rocking transversely of the body about a common rocking axis at the lateral mid-portion of the truck body. The use of a turntable for the wheels is not satisfactory as the rotational axes of the two wheels would be so close together as to be substantially coincident in extreme turned positions, thus affording no forces at the rear of the body opposed to transverse tilting of the body.

The nearest solution thus far has been the compromise of using a transversely rockable wheel suspension with the wheels dirigibly mounted on the ends of a rocking beam which extends crosswise of the body, and introducing heavy supporting springs between the rocking beam and the body for stabilizing the load. This arrangement is not satisfactory as the springs occupy too much of the space in which the wheels could otherwise be turned and, therefore, greatly limit the steering angle of the wheels. This disproportionately increases the turning radius of the truck.

Furthermore, when a heavy cargo is being lifted by the hoist, which is forwardly of the front wheels, the cargo introduces a moment which tends to counterbalance or reduce the effective weight of the load imposed on the springs by the battery bank. Springs strong enough to stabilize the battery bank load when the hoist is empty are too strong to permit proper rocking of the beam when the hoist is loaded with cargo. Accordingly, when one rear wheel runs over an obstruction, it tilts the entire truck, often to such a degree that of one of the driving wheels is lifted from the ground. This results in stalling the truck.

If no springs, or too weak springs, are provided, a rapid turn of the truck around a corner, particularly when the hoist is unloaded, can readily cause the truck to overturn. Likewise, since not much room is available for vertical movement of the beam ends, weak or large springs deflect against the body and present at one side of the rocking axis a solid abutment which arrests rocking of the beam if the wheel at that side passes over a substantial obstruction. Thereafter, the lifted wheel continues rising and thereby tilts the entire body of the truck to such an extent that one of the driving wheels is lifted clear of the ground.

Generally, due to inability to stabilize the battery or power mechanism load on the dirigible wheels, while permitting them a wide angle of rocking, and to provide a short turning radius for the truck, the use of these trucks has been limited to areas such as the inside floors of factories and paved outside areas and ramps which are relatively free from uneveness. They have not proven satisfactory for rough outside terrain, such as the average factory lot or yard where chuck holes, rail crossing,s catch basin drains, and debris must be contended with.

The problem, therefore, of providing a truck of this type for general use in factories and outside in the usual factory lots or yards is one of providing a proper wheel and spring assemblage. The wheels should be of relatively narrow gauge. They should permit resilient stabilization of the load. Their mounting should permit each wheel to rise and fall independently of the other to a considerable degree without tilting the truck body or lifting its drive wheels from the ground. They should be steerable so as to roll in paths in all directions from fore and aft of the body to almost directly crosswise of the body.

The present invention and wheel assemblage meets these requirements.

Various more specific objects and advantages of the invention will become apparent from the following description wherein reference is made to the drawings, in which:

FIG. 5 is a side elevation of the structure illustrated in FIG. 4; and

FIG. 6 is an enlarged fragmentary top plan view, similar to FIG. 4, showing the wheels in an extreme position for a left turn.

Figure 1:
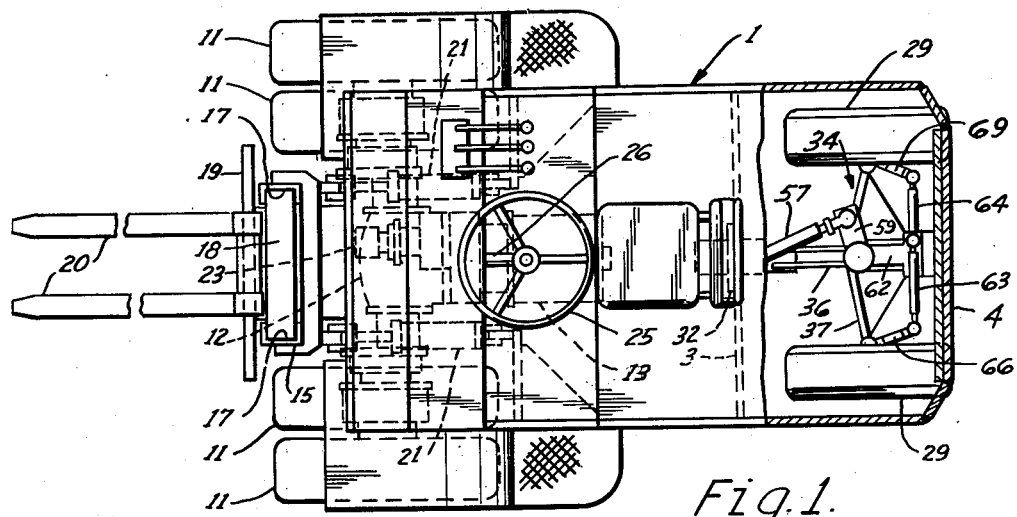
FIG. 1 is a top plan view of an industrial lift truck embodying the principles of the present invention.
Figure 2:
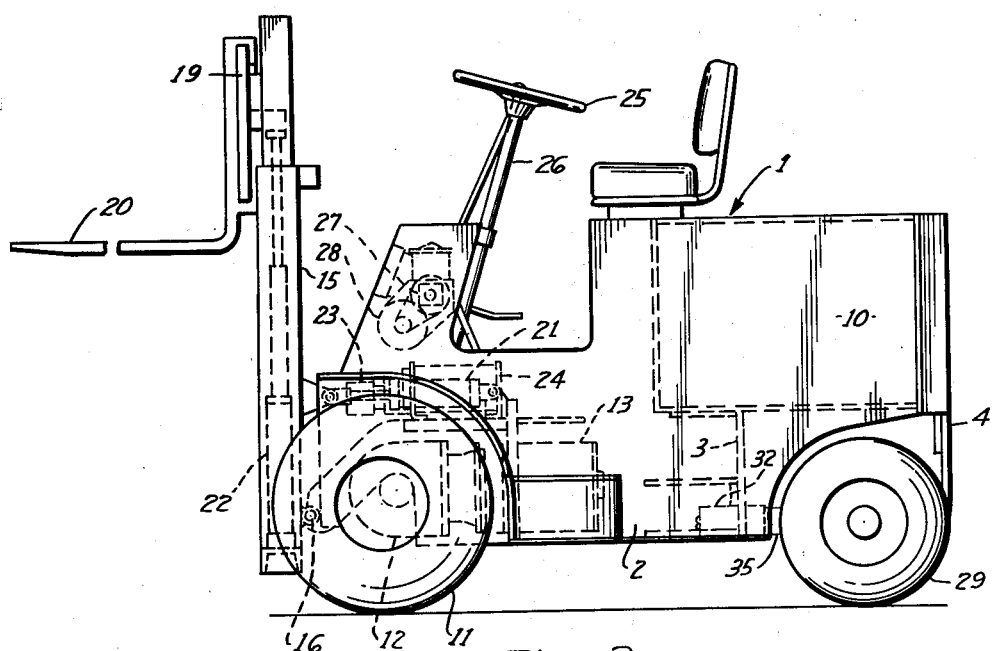
FIG. 2 is a side elevation of the truck illustrated in FIG. 1.
Figure 3:
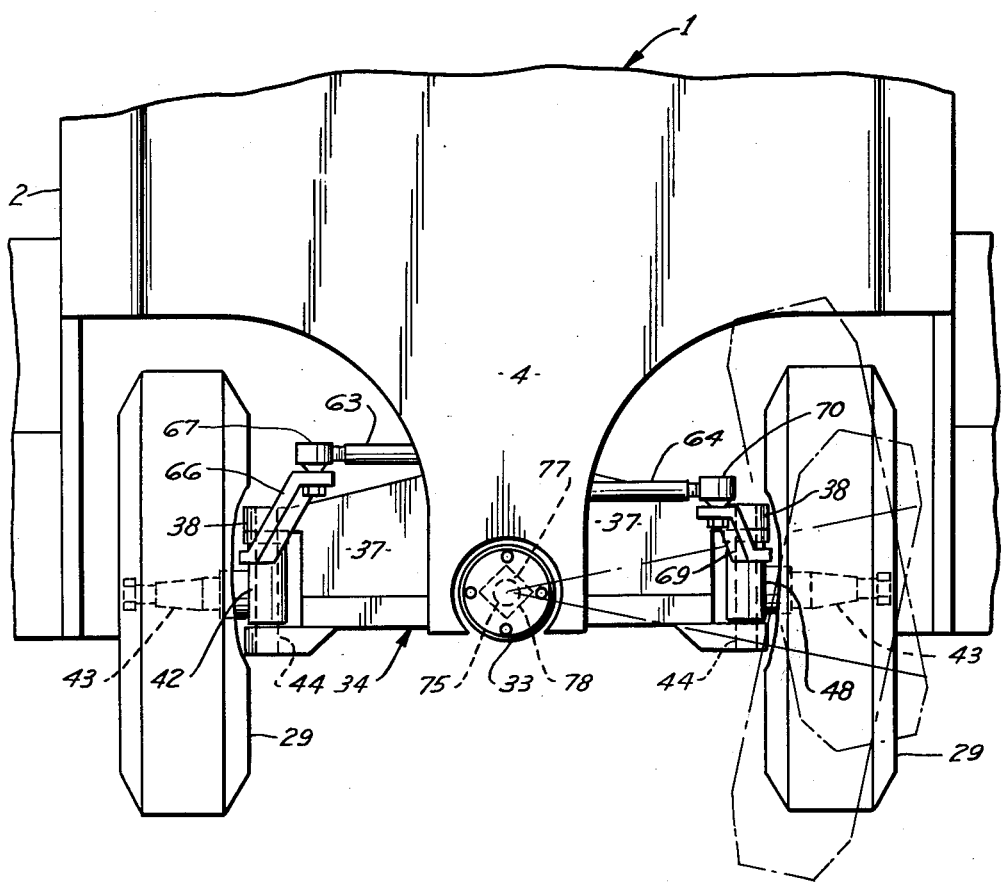
FIG. 3 is a fragmentary rear elevation of the truck illustrated in FIGS. 1 and 2, showing the rear wheel suspension.

Referring to the drawings, the invention is shown as embodied in an industrial lift truck, indicated generally at 1, comprising a body 2 having an intermediate cross frame member 3 and a rear cross frame member 4, both of which may be in the form of heavy, upright steel plates. These members support the rear wheel assemblage of the present invention, later to be described.

Extending from the rear of the body partway toward the front thereof is a large compartment 10 of which the floor is just clear of the wheels. In a truck of the electric motor driven type, as illustrated, this compartment contains the battery bank. In a truck of the internal combustion engine driven type, it contains the engine fuel supply, engine, and other heavy power equipment.

The body is supported at the front end by a pair of dual non-dirigible driving wheels 11 which are driven through a suitable power transmission 12 by an electric motor 13. At the forward end of the body is a hoist, including an upright pedestal 15 connected to the body by a transverse pivot 16 for rocking forwardly and rearwardly of the body. The pedestal has a guideway 17 which accommodates a slide 18 of an elevator carriage 19. Mounted on the carriage 19 for transverse sliding movement is a cargo support 20 which can be shifted laterally of the truck body.

The pedestal can be rocked fore and aft about the pivot 16 by means of a piston and cylinder assemblage 21. The carriage 19 can be lifted and lowered along the slideways 17 by means of a piston and cylinder assemblage 22 to which pressure fluid is supplied from a pump 23 driven by a motor 24.

A steering wheel 25 is provided and is connected to a steering post 26 which, in turn, is connected to the rear wheel steering mechanism, as will later be described. For furnishing fluid under pressure for power steering, a hydraulic pump 27 driven by a motor 28 is provided.

The mechanism as thus far described does not embody the present invention, but is one of a number of types of trucks of the general character with which the present invention is concerned.

As pointed out, it is desirable that a narrow gauge rear wheel assemblage, including wheels 29, be provided and that this assemblage permit the rear wheels 29 to rise and fall up to as much as a foot, independently of each other, without tilting the body due to one wheel striking an obstruction of substantial height, or due to the unstable nature of the load in compartment 10. This would permit the use of the truck on the rough terrain of factory lots. This problem is acute when the wheels must rise and fall by rocking about an axis extending forwardly and rearwardly of a truck midway between its sides, and yet must be dirigible so that they can be turned to roll in paths almost directly transversely of the truck. To meet this situation, a special rear wheel assemblage, with which the present invention is chiefly concerned, is employed.

The rear wheel assemblage is supported by suspending plate members 30 and 31 which are welded to the cross members 3 and 4. At its lower end, the member 30 carries a fixed and rigid housing 32 in the form of a sleeve or socket with its axis extending forwardly and rearwardly of the truck body. The member 31 likewise carries a fixed housing 33, also being in the form of a sleeve or socket.

Rockably mounted at its opposite ends in the sleeves 32 and 33, respectively, is a wheel support, indicated generally at 34. This support is in the form of a housing 35 which is mounted at its ends in the sockets or housings 32 and 33, respectively, for rocking about an axis extending forwardly and rearwardly of the body. The housing 35 is reinforced by a forwardly and rearwardly extending rib 36. A transverse rocking beam 37 is fixedly secured to the housing 35 for rocking therewith. At its outer ends, it is provided with yokes 38 for connection to wheel spindles.

The ends of the sleeve 35 are mounted in their associated sockets 32 and 33, respectively, in plain rocking bearings 39 and thrust bearings 40, so as to be held in fixed position axially in the housing, while freely rockable.

Mounted in each yoke 38 is a spindle supporting sleeve 42 which is rigid with a spindle 43. The spindles are supported by suitable pivot pins 44 which are received in the sleeves 42 and in the yokes 38. Thus the spindles can swing about the axes of the pins 44 for steering in all rocked positions of the housing 35 and beam 37.

For steering the rear wheels, the steering post 26 is rotatably mounted in a steering gear box 48 on the truck frame and is connected by conventional gears to a pitman arm 49. The pitman arm, in turn, is connected by a ball and socket joint 50 to a drag link 51. The link 51 is connected at its opposite end to a rotatable valve stem 52. A conventional booster power cylinder 53, of a type readily available on the market, accommodates a piston 54 having a rod 55 which, in turn, is connected by a ball and socket joint 56 to the body frame. The opposite end of the cylinder 53 is connected to a rigid rod 57 which is connected by a ball and socket joint 58 to a steering arm 59. The power booster cylinder 53 forms no part of this invention, but is one of the type which, in response to movement of the drag link 51 in opposite directions, and resultant operation of the valve stem 52, causes the cylinder 53 to react against its piston and move in opposite directions corresponding to turning of the steering wheel, and thus move the rod 57 and the arm 59 in opposite directions, selectively.

The arm 59 is rotatably mounted on a suitable pivot 60 which, in turn, is fixedly secured to the housing 35. For this purpose, the arm 59 is rigidly connected to a sleeve 61 which is rotatable on the pivot 60 and which, in turn, carries a rigid arm 62 which is rotatable with the sleeve in fixed position relative to the arm 59. A suitable linkage connects the arm 62 to the spindles, respectively, for steering the dirigible rear wheels. For this purpose, tie rods 63 and 64 are pivoted to the arm 62. The rod 63 is pivotally connected at one end to the arm 62 for rocking about an upright axis 65 and at its opposite end is pivotally connected to an arm 66 for rocking about an upright axis 67. The arm 66, in turn, is fixedly secured to the sleeve 42 of one of the spindles 43 for rotation therewith about an upright axis of the pin 44. Correspondingly, the tie rod 64 is connected at one end to the arm 62 for rocking about an upright axis, as indicated at 68, and at the other end is connected to an arm 69 for rocking about an upright axis 70. The arm 69 is rigidly connected to the sleeve of the other spindle 43.

Figure 4:
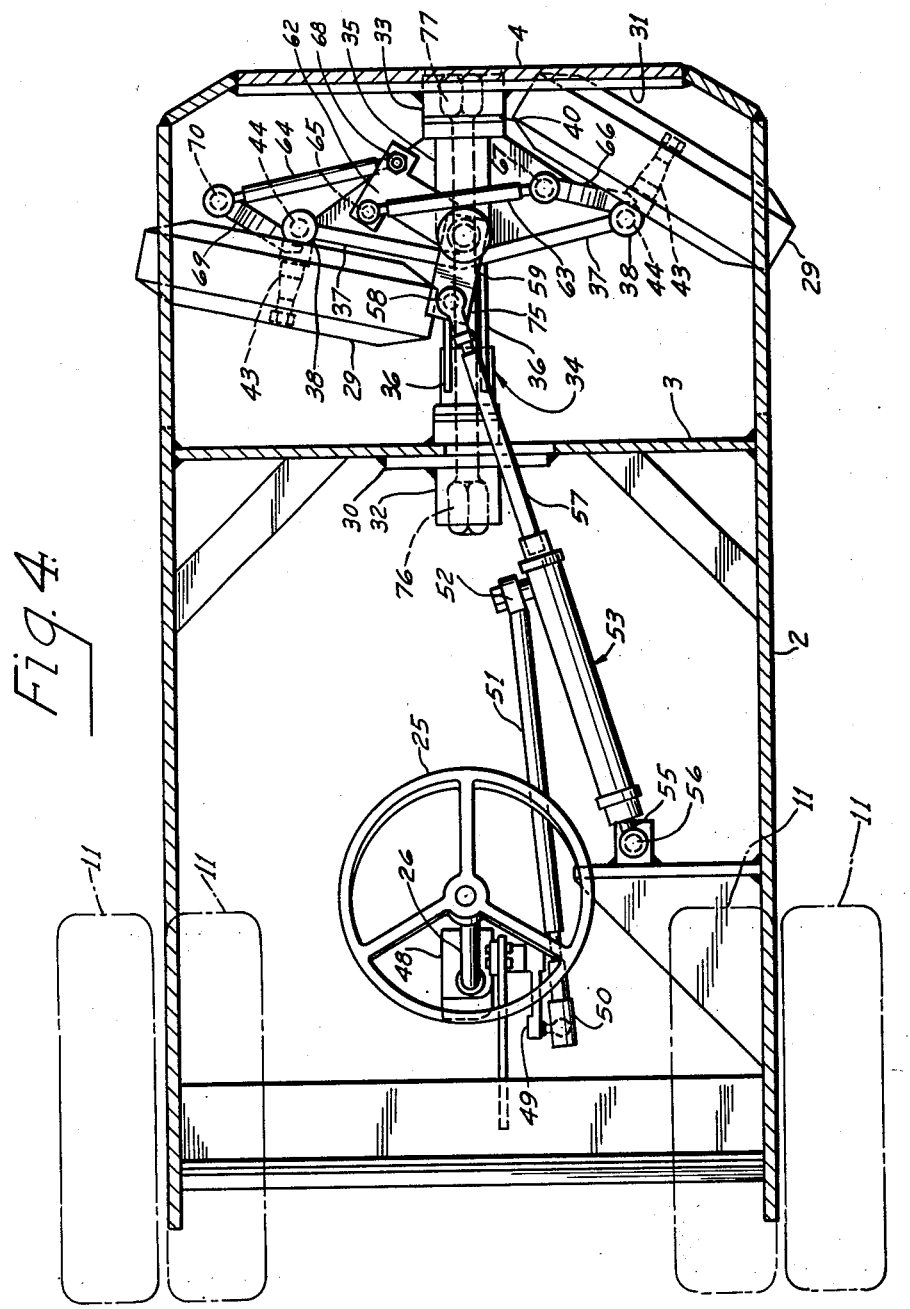
FIG. 4 is a top plan view of the rear wheel assemblage and the steering mechanism therefor, showing the wheels in a position for an extreme right turn, part of the truck structure being omitted for clearness in illustration.

By forward and rearward movement of the cylinder 53 and rod 57 in response to the movement of the drag link 51 and its setting of the valve 52, in response to rotation of the steering wheel, the wheels 29 can be steered from the full line position shown in FIG. 4 to the full line position shown in FIG. 6, thus providing either a right or a left turn with the wheels 29 extending almost at right angles to the length of the truck body. It is to be noticed by observation of FIGS. 4 and 6, that very little space is available for accommodating the wheels 29 throughout their steering movements of a few degrees less than 180° about the axes of the pins 44. This, of course, leaves practically no room for springs beneath the floor of the compartment 10 adjacent the rear wheels. Furthermore, since as much of the capacity of the truck must be used as possible, no room for springs is available at the front or at the rear of the wheels 29. However, the load in the compartment 10 is unstably supported with the arrangement thus far described.

In order to stabilize this load, a torsion bar 75 is provided for resiliently resisting the rocking of the beam 37 and wheels 29 relative to the body, while at the same time permitting them to rise and fall without striking the body in case one or the other strikes an obstruction. The torsion bar 75 preferably is a simple spring steel rod of circular cross section having large non-circular portions at its ends, respectively. In the form illustrated, end portions 76 and 77 of square cross section are provided. One of the end portions, preferably the forward end portion 76, is secured in fixed relation to the sleeve or socket 32 rigid with the truck body. For this purpose, the sleeve 32 is provided with a passage of square cross section which receives the portion 76 with a snug or press fit.

The rear end 77 of the bar, however, fits the corresponding end of the housing 35. For this purpose, the housing 35 is provided with a socket 78 which is square in cross section so as to fit the square end portion 77 of the torsion bar 75. Thus, upon rocking of the wheels, the housing 35 is rocked, and through the medium of the square end portion 77 of the torsion bar 75 tends to twist the torsion bar 75 about its longitudinal axis. Since the forward end 76 of the bar is non-rotatably secured relative to the body, this torsional stress is transmitted to the body and thereby resiliently resists the rocking of the wheels due to the torsional resiliency of the bar 75.

As a result, spring suspensions can be eliminated. The bar 75 can be made sufficiently resistant to torsion to stabilize the heavy battery load, while at the same time permitting the wheels to rock properly. It interposes no continual thrusts, as do springs, which must be proportioned initially to the load and would tend to tilt the body if the effective force of the battery load were varied by a cargo on the hoist.

All spring suspensions other than the torsion bar itself can be eliminated and all of the limited space beneath the rear end of the truck can be utilized for the purposes of accommodating the wheels throughout a wide range of rocking and steering positions. Since the bar is within the housing 35, space in the housing which would otherwise be wasted is used for the bar and the space under the rear of the truck which otherwise would have to be used for springs is useful for affording more space for turning and rocking of the wheels.

Normally, it is in unstressed condition, or in a very slightly stressed condition proportioned to any lateral unbalance of the dead load on the truck, and it can be twisted in either direction from its normal unstressed condition. Thus, it is not pre-stressed or pre-loaded. Consequently, should the torsion bar break, the sole result would be instability of the load. This is an advantage over heavy springs. Since they are continually under strain, each bearing approximately one half of the load and stabilizing it, should one break, the other would relieve its strain by urging all of the load to tilt to the side of the broken spring, thus greatly reducing stability of the truck and possibly upsetting it. The torsion bar, therefore, is a fail-safe device.

Having thus described my invention, I claim:

1. An industrial truck including a body member, wheel means supporting one end of the body member, a wheel assemblage supporting the opposite end of the body member, said assemblage comprising an elongated rigid housing member, coaxial forward and rearward rock bearings mounted in fixed position on the body member, complimentary rock bearings on the ends of the housing member, respectively, and connected with said forward and rearward rock bearings, respectively, and supporting the housing member for rocking about a rocking axis extending forwardly and rearwardly of the body member and in fixed position relative thereto, an elongated rigid cross beam secured on the housing member and rockable therewith in fixed position relative thereto about said rocking axis, a pair of wheel spindles, generally upright pivot means dirigibly supporting the spindles on opposite ends of the cross beam, respectively, in fixed position relative to the cross beam axially of the pivots and for swinging about the axes of the pivots, respectively, wheels on the spindles, respectively, said housing member having a passage extending endwise thereof, an elongated metal torsion bar in said passage, means connecting one end of the bar to the body member for rocking therewith about said rocking axis, and means connecting the other end of the bar to the housing member for rotation therewith about said rocking axis.

2. The truck according to claim 1 wherein the torsion bar is the sole means resiliently resisting movement of the wheels toward and away from the body.

3. The truck according to claim 1 wherein the passage is aligned with the forward and rearward bearings and the torsion bar is coaxial with said forward and rearward bearings.

4. The truck according to claim 1 wherein the rearward bearing is substantially at the rear limit of the wheels in the straight ahead position of the wheels, the forward bearing is forwardly from the forward limit of the wheels in said straight ahead position, and the torsion rod is at least as long as the distance between said bearings.

5. The truck according to claim 1 wherein the torsion bar is connected to one member adjacent the rearward bearing and to the other member forwardly of the forward bearing.

6. The truck according to claim 5 wherein the torsion bar is connected to the housing member at the rearward bearing and to the body member forwardly of the forward bearing.

References Cited in the file of this patent

UNITED STATES PATENTS

| | | |
|---|---|---|
| 2,221,196 | Klavik | Nov. 12, 1940 |
| 2,835,507 | Davies | May 20, 1958 |
| 2,948,546 | Fabere et al. | Aug. 9, 1960 |